United States Patent
Teale

[15] 3,681,602
[45] Aug. 1, 1972

[54] DEVICE FOR DETECTING AND RECORDING ELECTROMAGNETIC RADIATION INCLUDING AN ACTIVE MAGNETIC ELEMENT A PARAMETER OF WHICH CAN BE CHANGED BY THE RADIATION

[72] Inventor: Richard William Teale, Sheffield, Yorkshire, England

[73] Assignee: U.S. Philips Corporation, New York, N.Y.

[22] Filed: Oct. 19, 1970

[21] Appl. No.: 81,856

Related U.S. Application Data

[63] Continuation of Ser. No. 756,999, Sept. 3, 1968, abandoned.

[30] Foreign Application Priority Data

Sept. 8, 1967 Great Britain..............41,190/67

[52] U.S. Cl.........250/83.3 R, 250/83.3 H, 324/0.5 F
[51] Int. Cl.................................................G01t 1/16
[58] Field of Search.....250/833 R, 83.3 H; 324/0.5 P

[56] References Cited

UNITED STATES PATENTS

| 2,953,688 | 9/1960 | Maxwell, Jr. et al.....250/83.3 H |
| 3,070,698 | 12/1962 | Bloembergen...........250/83.3 H |
| 3,274,387 | 9/1966 | Putley......................250/83.3 R |
| 3,535,519 | 10/1970 | Busch et al..........250/83.3 R X |

OTHER PUBLICATIONS

Cyclotron Resonance Experiments in Silicon and Germanium, by Dexter et al., from Physical Rev., Vol. 104, No. 3, Nov. 1, 1956, pps. 637– 644.

*Primary Examiner*—Archie R. Borchelt
*Attorney*—Frank R. Trifari

[57] ABSTRACT

A device for detecting and/or recording electromagnetic radiation which employs as an active element one which responds to the electromagnetic radiation by changing a magnetic parameter thereof such as anisotropy, coercivity or permeability. The active element contains metal ions of which two different energy states as regards a free electron can exist. Ions in one state can absorb energy from electromagnetic radiation to transfer across an energy threshold to the other energy state.

7 Claims, 4 Drawing Figures

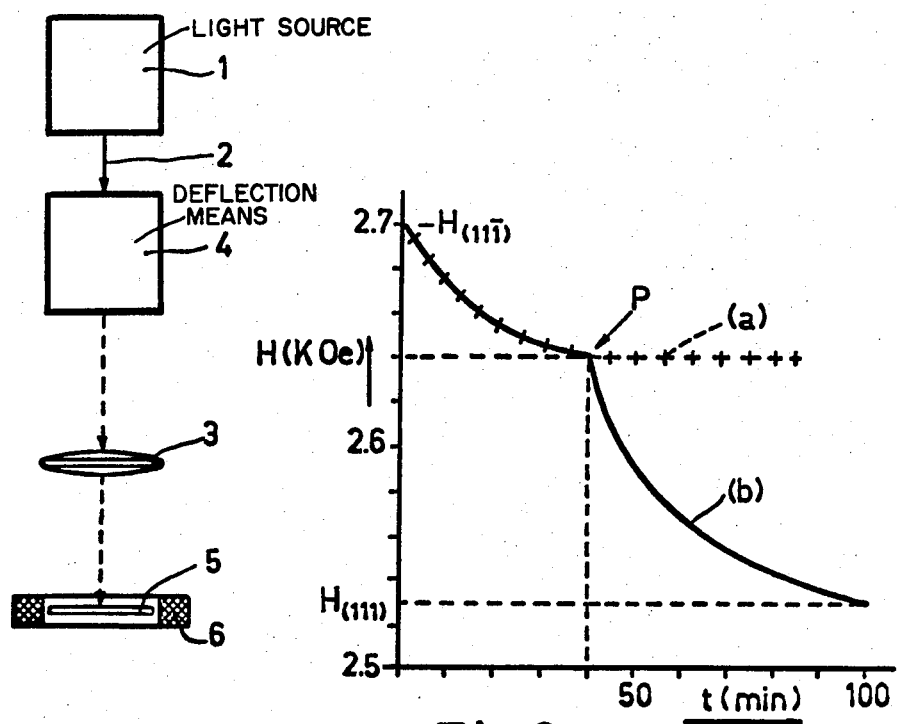
Fig.1
Fig.3
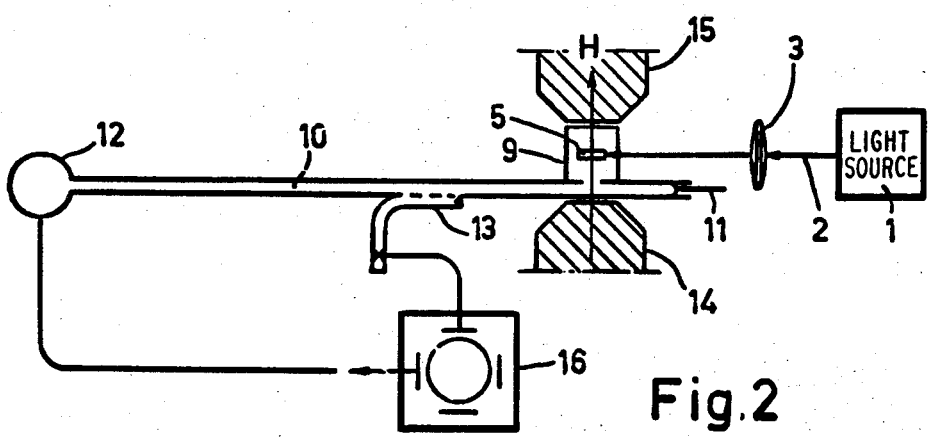
Fig.2
INVENTOR.
RICHARD W. TEALE

DEVICE FOR DETECTING AND RECORDING ELECTROMAGNETIC RADIATION INCLUDING AN ACTIVE MAGNETIC ELEMENT A PARAMETER OF WHICH CAN BE CHANGED BY THE RADIATION

This application is a continuation of application Ser. No. 756,999, filed Sept. 3, 1968 now abandoned.

The invention relates to devices and methods of responding to electromagnetic radiations, such as light or infra-red, or changes therein.

According to alternative aspects of the invention, there are provided:

1. A device for responding (e.g. by giving a detection signal, forming a persistent or semi-permanent record, or giving rise to a servo or control electrical output to apply corrections) to an electromagnetic radiation comprising a sample being an active element having a magnetic parameter capable of changing on the element's penetration by such radiation and means to detect changes in said magnetic parameter (which parameter may be an anisotropic field in a sample, the field being made manifest by observing such phenomena as a magnetization component along a specific direction, hysteresis loop, resultant torque, susceptibility or ferromagnetic resonance).

2. A radiation-responsive device comprising a ferrimagnetic active element with a magnetic anisotropy sensitive to electromagnetic radiation (e.g. light or the near infra-red) and rendered observable.

3. A method of detecting, making a record of, testing for presence of, or electrically controlling with reference to, an electromagnetic radiation comprising observinG a magnetic effect in an active element sample.

4. An active element of a ferrimagnetic material in which electrons have to migrate through the crystal passing from one ion to another before the minimum free energy state can be assumed, or re-assumed, and means to detect magnetic anisotropy changes therein.

5. A light detector active element of an iron garnet or spinel ferrite having some iron ions in a divalent state, most being in the normal trivalent state.

6. Method of manufacturing an active element comprising substitution of another element for some iron in, or heating to drive off some oxygen from, an iron garnet or spinel ferrite, whereby some divalent iron ions become present; or 7. A device or method for magnetically responding to light or the like in a time-integrated manner, i.e. the effect sums as the time of penetration of an active element by the light or the like is increased.

Embodiments of the invention use a sample of ferrimagnetic material as an active element in such devices. The amount of radiation which has fallen on a sample is recorded through the change in the magnetic anisotropy field of the sample which is produced when the radiation is absorbed. This change in the anisotropy field may be observed in several ways, for example (a) by the resulting change in the static magnetic field which must be applied to the sample in order to induce ferromagnetic resonance when an oscillatory magnetic field of a fixed frequency is also applied to the sample, (b) by the change in the torque on the sample due to the magnetic anisotropy of the sample when the sample is held in a magnetizing field, (c) by the change in the magnetic susceptibility of a sample when the susceptibility is measured using an oscillatory magnetic field of small amplitude, (d) by the change in the shape and/or size of the hysteresis loop of a sample when this is measured using an oscillatory or cycled magnetic field of somewhat greater magnitude than that mentioned in (c) above, (e) by the change in the component of magnetization of a sample along a given direction.

All magnetic materials exhibit an effect known as magnetocrystalline anisotropy to a greater or lesser extent; this implies that single crystal samples are more easily magnetized in some crystallographic directions than in others. In ferrimagnetic materials, a high degree of local alignment of the magnetism of the electrons in the material occurs spontaneously within regions called magnetic domains and the magnetocrystalline anisotropy is manifest in these materials through the magnetic field which must be applied to a sample in order to rotate the spontaneous magnetization from the crystallographic "easy direction" of magnetization to other crystallographic directions. The magnetocrystalline anisotropy can thus be thought of as producing an effective magnetic field along the easy direction (or directions) of magnetization; this effective field is termed the anisotropy field.

A source of the magnetocrystalline anisotropy is the variation of the energy of the electrons contained by a sample with the crystallographic direction in which the spontaneous magnetization is oriented. In most materials their electrOns very rapidly distribute themselves between the states which they can occupy so as to reduce the free energy of the sample as far as is possible whenever the orientation of the spontaneous magnetization is changed; this normally happens so rapidly that only measurements made at very high frequencies (for example microwave frequencies) can detect its occurrence. The redistribution of electrons normally takes place through the exchange of energy between the electrons and the vibrations of the ions, or of the electron spin directions, which are present due to thermal agitation. The effect of the redistribution of the electrons upon the magnetocrystalline anisotropy is considerable; in general it changes both the magnitude and the direction of the effective anisotropy field.

We have discovered that in some materials a significant part of the redistribution of the electrons occurs much more slowly than was indicated above, and may, for some part of the redistribution, take many hours. Thus, if the electrons are allowed to take up their preferred states for a given orientation of the spontaneous magnetization and then the conditions are adjusted to make the redistribution very slow (normally by cooling the sample), the magnetocrystalline anisotropy is found to continue to be governed (in part at least) by the "frozen in" electron distribution even though the spontaneous magnetization is rotated to directions other than that at which the electron distribution became partially "frozen in." In some of these materials an additional vital factor is that the redistribution of electrons which takes place very slowly (or at a negligible rate) due to exchange of energy with thermal vibrations can be effected instead by the absorption of photons of radiation in the infra-red or visible region of the spectrum, the photons providing the energy to redistribute the electrons which is lacking in the thermal vibrations. Thus the anisotropy field can be changed, since the electron distribution is changed, by the action of the photons. The "freezing in" of the magnetocrystalline anisotropy field referred to above has been termed "magnetic anneal;" the effect of the photon which might be termed "photomagnetic anneal" has not previously been reported and it is believed that it is upon this effect in an active element that the embodiments are based.

Materials in which the above effects are readily observed, and all the more dramatically at low temperatures, e.g. that of liquid nitrogen, are those ferrimagnetics in which a few of the electrons must migrate through the crystal passing from one ion to another in order to come to the distribution with minimum free energy. It is this migration which can become very slow and can be stimulated by the absorption of photons. Examples of the materials concerned are yttrium iron garnet or rare earth iron garnets which have been prepared in such a manner (for example by the substitution of some silicon for iron or by heating to drive off a small part of the oxygen) that whereas most of the iron ions are in the normal trivalent state a fraction in the divalent state. Spinel ferrites form another example where again iron in the divalent and trivalent states can be caused to coexist in the same sample by selection of the chemical composition, by substitution of suitable ions or by heating to drive off oxygen.

The invention will be further explained by way of example with reference to the accompanying drawing, in which;

FIG. 1 is a diagrammatic view of a device for detecting and or recording electromagnetic radiation according to the invention;

FIG. 2 is a device for observing the magnetic anisotropy change;

FIG. 3 is a graph used to illustrate the magnetic anisotropy change;

Figure 4:
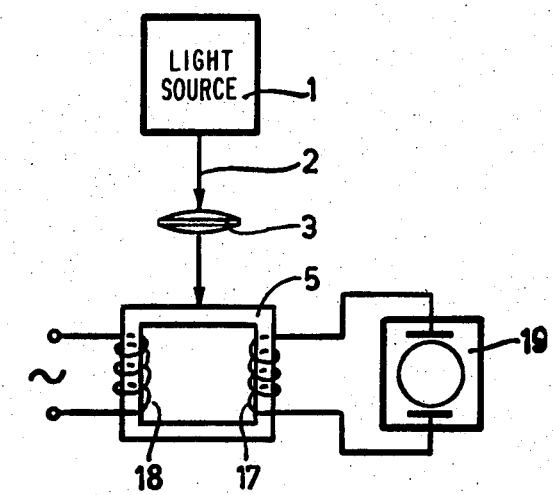
FIG. 4 is a device for observing the magnetic permeability or coercivity change.

In FIG. 1 an active magnetic element, i.e. an element a magnetic parameter of which can be changed by photon irradiation is shown at 5. The thickness of the element is such that the material is sufficiently transparent for the photon beam 2 which is produced by the light source 1. The beam 2 which is produced by the source 1 impinges on the active element 5 by way of deflecting means 4 (an electrooptical deflector) for deflecting the beam in a direction perpendicular to the plane of the drawing and by way of a lens 3. The element 4 enables the beam to be localized on the active element 5.

Surrounding the element 5 is an electromagnet 6 which can be energized to produce a magnetic field at right angles to the element 5.

After the element 5 has been given a degree of magnetization perpendicular to its plane, irradiation of the element will locally change the degree of magnetization. Thus, there is formed an "image" in terms of the component of magnetization perpendicular to the plane of the element. It is noted that by moving the magnetic element sample, or many small samples, past the radiation beam a continuous recording somewhat similar to a magnetic tape would be obtained.

The magnetic parameter change is observed quantitatively by means of the device shown in FIG. 2. A rectangular microwave resonance cavity 9 is coupled to a wave guide 10 by a hole. A reflecting piston 11 near the hole can be adjusted so as to match the cavity 9 to the guide 10 at the resonance frequency. In the cavity 9 an active magnetic element sample 5 in the form of a thin slice is placed. A frequency-modulated klystron 12 provides the microwave energy. The reflected signal from the cavity is fed to a crystal detector by means of a directional coupler 13. The rectified voltage is displaying the mode of oscillation of the klystron on a cathode-ray oscilloscope 16, the time base being the same as the modulation voltage. Resonances are observed as dips in the mode and small dips of a frequency meter can be brought to coincidence in order to measure the resonance frequency. A static magnetic field is supplied by a magnet of which the poleshoes 14, 15 are shown; by adjustment of this field, or of the microwave frequency, the sample can be brought into ferromagnetic resonance, which is characterized by a strong dispersion in the magnetic susceptibility of the sample and the absorption of energy from the microwave field by the sample. If the sample is taken to a temperature at which electron redistribution through the exchange of energy with thermal vibrations becomes negligible (or slow) then the sample will remain in ferromagnetic resonance with the microwave frequency and the static field at steady (or slowly changing) values. If now the sample is exposed to photons in the beam 2 which is produced by light source 1 and which after having passed the lens 3 enters via an aperture in the face of the cavity if the spontaneous magnetization is oriented in a direction for which the existing electron distribution is not in equilibrium then the anisotropy field will change and the sample will move out of ferromagnetic resonance. Small changes of this kind, which may move the sample only a small fraction of the way through the dispersion and absorption regions mentioned above, can readily be detected in the microwave circuits and hence the incidence of the photon beam detected. If the photon beam is now turned off or interrupted the electron distribution will not return to that which it had before the beam was switched on but remain at the value to which it was driven by the photons. A persistent change in the anisotropy field and hence in the resonant condition will have taken place; there is therefore a record of the amount of photon radiation which fell upon the sample. If radiation is allowed to fall upon the sample for some time (which will be shorter the greater the intensity of the photon beam) the effect of the beam in changing the anisotropy field becomes smaller and finally saturates; this is because the electrons have reached a distribution approximating to that which is in equilibrium. To start the process of exposure again the saturation magnetization can be rotated to a different direction by rotating the static field with respect to the sample.

The static magnetic field may be aligned in any direction except that in which the microwave field is directed, at the location of the sample; some directions will be found to give more sensitivity in response to weak photon beams.

As a numerical example, a sample active element with approximate composition $Y_3Fe_{4.9}^{3+}(Fe^{2+}Si^{4+})_{0.1}O_{12}$ was found to be in ferromagnetic resonance in a rectanGular waveguide cavity. It was arranged that there could enter a beam of photons in the near infrared to impinge on and penetrate into the sample located centrally in the cavity.

As is shown in FIG. 3 is was found that resonance for a (111) crystallographic static field (in the "x" waveguide direction), having cooled the sample down to 20°K with the field continuously in this direction, required that the strength of the field be 2,530 gauss.

The field was altered to lie along the (111) direction. It was discovered that its strength had to be altered to 2,700 gauss to regain the resonance condition.

Spontaneously, perhaps taking one-half hour, this equilibrium field had to be altered to 2,640 gauss, remaining constant at this intensity thereafter.

Finally, the infra-red beam was switched on, penetrating the sample since it is somewhat transparent to this near infra-red wavelength, and resonance was lost, The resonance condition could only be regained by adjusting the static field strength to 2,505 gauss.

Thus photon irradiation caused anisotropy changes in the sample, which by this sensitive detecting method, required about 140 gauss change in the static field to compensate.

As mentioned earlier many other properties of ferrimagnetic materials besides the ferromagnetic resonance condition are sensitive to the anisotropy field, and such properties may be used to detect the effect of the photon beam upon this field.

In FIG. 4 an active magnetic element sample in the form of a core 5 carrying a magnetizing coil 18 fed with A. C. is shown which can be used to measure the magnetic susceptibility of the material of the sample. If the anisotropy field of the sample is "frozen in" by cooling or by photon irradiation at a suitable temperature (with or without an applied magnetic field during this preparation) then the magnetic susceptibility measured will be strongly influenced by this anisotropy field. If now a photon beam 2 which is produced by the light source 1 impinges on the element 5 by way of lens 3 (with or without the presence of an applied field other than that used to measure the susceptibility) the anisotrophy field will be changed with a consequent change in the susceptibility. This effect may be used to detect and record the effect of the photon beam. The effects described herein are enhanced by the high sensitivity of the motion of magnetic domain walls to magnetic anisotropy and especially to that part which is due to magnetic anneal. The motion of magnetic domain walls makes an important contribution to the magnetic susceptibility under many conditions. A test was carried out on $Y_3Fe_{4.95}^{3+}(SiFe^{2+})_{0.025}O_1$.

A body consisting thereof was cooled down to 77°K in the dark and dermognetized. A permeability $\mu$ of approximately 40 was measured. Then the body was irradiated with photons having a maximum wavelength of approximately 1.5 $\mu$ and an intensity at the surface of approximately $10^{-2}$ Watt/sq.cm. The magnetic permeability was found to decrease slowly until it was approximately 14 after 3 minutes. If the amplitude of the oscillatory signal was raised from the lowest values until the magnetization of the sample is caused to execute a minor hysteresis loop whose shape and size is largely governed by magnetic domain wall motion. The shape and size of the hysteresis loop may be examined by studying the electromotive force induced in a further search coil 17 also wound upon the sample core and the changes in the hysteresis loop may thus be used to detect and record the effect of a photon beam upon the sample.

An experiment likewise carried out on a $Y_3Fe_{4.95}^{3+}(SiFe^{2+})_{0.02512}$ body cooled down to 77° K. in the dark, shows that irradiation with photons ($\lambda = _{max}$ = approximately 1.5$\mu$) causes an increase in coercive force. The coercive force is found to have increased from approximately 0.5 to approximately 0.8 Oersted.

Throughout the foregoing attention has been concentrated upon the detection and recording of photon beams. All the devices could be used as means for the control of the anisotropy field and through this the magnetization, hysteresis loop, susceptibility or ferromagnetic resonance condition, by the action of a photon beam. The effect of the changed magnetic property of the sample could then be arranged to cause a desired effect in the electrical circuit.

The above embodiments are thus seen to be characterized by observing what may be desired as photomagnetic phenomena, and also involve an important new type of material characterized in that it can exhibit such phenomena. Various ways of observing the action can be chosen, e.g. from the above-mentioned examples, according to specific requirements or convenience. Further ways of observing, also examples of further specific materials for the active element sample will occur to those skilled in the relevant arts.

Alternatively the above embodiments can all be regarded as providing a method of responding to electromagnetic radiation or to changes in electromagnetic radiation, characterized by observing changes in the magnetic anisotropy of an active element subjected to the radiation.

What is claimed is:

1. A device for detecting and recording electromagnetic radiation comprising an active element consisting of a ferrimagnetic material a magnetic parameter of which can be changed by photons, means to expose the active element to a photon beam, and a magnetic detector to observe the magnetic parameter change, said active element having an ionic crystal structure wherein ions are present on different lattice sites whereby irradiation of the active element with electromagnetic radiation redistributes the ions which modifies the magnetic properties of the active element.

2. A device according to claim 1, wherein the magnetic parameter observed aS anisotropy, coercivity or permeability.

3. A device according to claim 2, including a magnet to apply a pre-polarizing magnetic field to the active element for a pre-polarization prior to irradiation.

4. A device according to claim 1 wherein the active element includes an iron garnet or a spinel ferrite having some iron ions in a divalent state, most being in the normal trivalent state.

5. A device according to claim 4, wherein the active element includes an iron garnet of the formula $M_3Fe_{5-\delta-\epsilon}^{3+}(A_\delta Fe_\epsilon^{2+})O_{12}$ wherein M is an element of the rare earths or a combination thereof and wherein A is an element with a valency different from 3, while $0 \leq \delta < 1$ and $0 < \epsilon < 1$.

6. A device according to claim 5, wherein M is Yttrium, A is Si and $\delta$ 0.

7. A device according to claim 4, wherein the active element includes a spinel ferrite having the formula $RFe^{3+}_{2-\delta-\epsilon}A_\delta Fe_\epsilon^{2+}O_4$, wherein R is of the group consisting of Ni, Zn, Co, Mg, Mn, and $(LiFe)_{0.5}$ and wherein A is an element with a valency different from 3 with $0 \leq \delta < 1$ and $< \epsilon < 1$.

* * * * *

UNITED STATES PATENT OFFICE
CERTIFICATE OF CORRECTION

Patent No. 3,681,602     Dated August 1, 1972

Inventor(s) RICHARD WILLIAM TEALE

It is certified that error appears in the above-identified patent and that said Letters Patent are hereby corrected as shown below:

Column 1, line 34, change "observinG" to read --observing--;

Column 2, line 30, change "electrOns" to read --electrons--;

Column 4, lines 65 and 66, change the composition to read --$Y_3Fe_{4.9}^{3+}(Fe^{2+}Si^{4+})_1O_{12}$-- on the same line;

Column 5, line 53, change "$4\ 95$" to read --$4.95$--; and change "$0\ 025$" to read --$0.025$--.

Column 6, line 51 change "aS" to read --is--;

Column 6, lines 61 and 62, change the formula from reading on two lines to read on one (1) line.

Signed and sealed this 12th day of February 1974.

(SEAL)
Attest:

EDWARD M. FLETCHER, JR.        C. MARSHALL DANN
Attesting Officer              Commissioner of Patents